R. POOLE.
Machine for Rubbing and Mixing Paints, Chemicals, &c.

No. 65,268. Patented May 28, 1867.

Witnesses: Inventor:

United States Patent Office.

ROBERT POOLE, OF BALTIMORE, MARYLAND.

Letters Patent No. 65,268, dated May 28, 1867.

---

IMPROVED MACHINE FOR RUBBING AND MIXING PAINTS, CHEMICALS, &c.

---

The Schedule referred to in these Letters Patent and making part of the same.

---

TO ALL WHOM IT MAY CONCERN:

Be it known that I, ROBERT POOLE, of the city and county of Baltimore, and State of Maryland, have invented certain new and useful Improvements in Machines for Rubbing and Mixing Paints, Chemicals, Fertilizers, &c., &c.; and that the following is a full, clear, and exact description of the same, reference being had to the accompanying drawings, making a part of this specification, in which—

Figure 1:
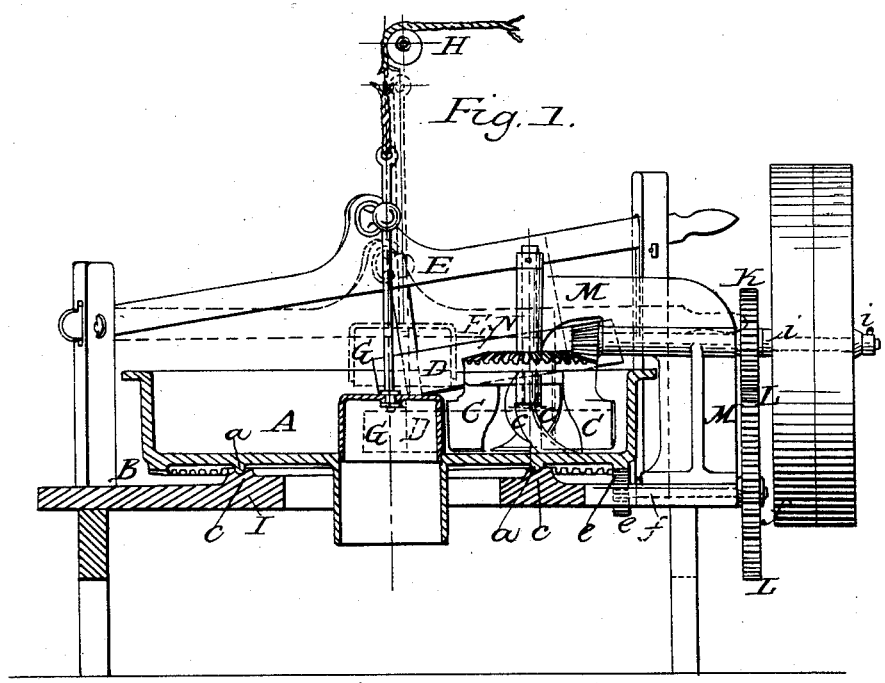
Figure 2:
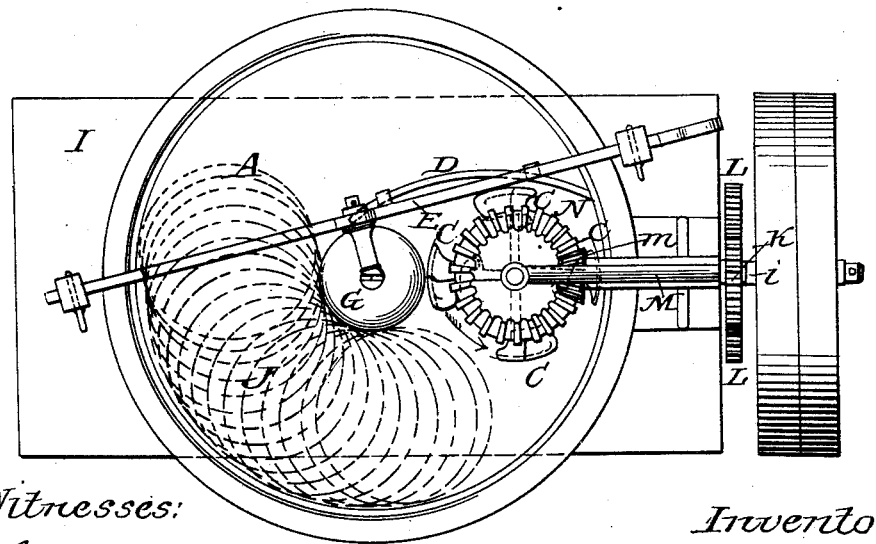

Figure 1 represents a vertical section taken through the red lines $x$ $x$ of fig. 2; and Figure 2 represents a top plan of the machine.

Similar letters of reference where they occur in the separate figures denote like parts in both of the drawings.

My invention consists, first, in combining with a pan, tub, or other suitable holding-vessel, revolving horizontally around its support, a rubbing or mixing apparatus that turns about its support in the same direction with the pan and in the pan; and my invention further consists in combining with the revolving pan or other vessel, and the rubbing or mixing apparatus, a guiding device, for causing the rotation of the pan and mixer to move the mixed or rubbed material to the central opening in the pan, whence it drops out and is carried away by any suitable conveyer.

To enable others skilled in the art to make and use my invention, I will proceed to describe the same with reference to the drawings.

On a suitable base I, the pan, basin, or other vessel A is arranged, so that it may be revolved, for which purpose a rib or circular projection, $a$, is made on the bottom of the pan, which rests and moves in a grooved way, $c$, on the base I, which groove may contain oil to cause the pan to run easily and without friction. Around the edge of the bottom of the pan there is a circular rack, B, into which a bevel gear, $e$, on the end of a shaft, $f$, takes, so as to rotate the pan. The power to drive the machine may be transmitted through a fast pulley on the shaft $i$ to said shaft. On this shaft $i$ there is a gear, K, that meshes with and gives motion to a gear, L, on the shaft $f$, and consequently to said shaft too. The shaft $i$ and gears are supported and turned in a bracket or arm, M, that projects over the perimeter of the tub far enough to receive, hold, and support the mixing, rubbing, or stirring devices, as will be explained. The shaft $i$ has upon its end a bevel pinion, $m$, that works in and turns a bevel gear, N, on a vertical shaft, $n$, suspended in or to the arm or bracket M, so as to turn freely therein. To the under side of the bevel gear N is fastened so that they will touch or nearly touch the bottom of the inside of the pan, a series of stirrers, mixers, or rubbers, C, that are carried around with said gear, or with its shaft $n$, and these stirrers may be of such shape and of such material as will best serve the special purpose for which the machine is used. The red lines J show the path of these revolving stirrers or rubbers upon the bottom of the revolving pan, both the stirrers and the pan, as shown by the arrows in fig. 1, moving in the same direction but in different circles.

When the material is sufficiently ground, rubbed, or mixed, the plug G is raised up out of the opening F in the central part of the pan, by means of a rope, H, or otherwise, and the scraper D upon the hinged or pivoted lever E is allowed to drop so as to come down upon or close to the bottom of the pan. The pan and stirrers are kept in motion, and the material being brought around by the pan, is by the stirrers or rubbers C thrown against the scraper D. The scraper D, as shown in fig 2, is of a curved form, and extends from near the perimeter of the pan to the opening F, and it guides and directs the material thus brought up and thrown against it to the opening F, whence it drops through, and by means of a trough or pipe, if liquid, or a conveyer if solid, the mixed substance may be carried off to any suitable receptacle, and the pan recharged for another similar operation.

Having thus fully described my invention, what I claim in a machine for rubbing and mixing paints, chemicals, fertilizers, and other substances, is—

A pan or other suitable holding-vessel, revolving around its support, and a series of rubbers or mixers in said pan, revolving around their and a different support, and in the same direction with the pan, substantially as described.

I also claim, in combination with a revolving pan and stirrers, a scraper which when let down in the pan will guide and direct the mixed or rubbed material to a central discharge opening in the bottom of the pan, substantially as described.

ROBT. POOLE.

Witnesses:
A. B. STOUGHTON,
EDM. F. BROWN.